United States Patent
Hamilton (10) Patent No.: US 12,121,841 B2
(45) Date of Patent: Oct. 22, 2024

(54) POLLUTANT FILTERING ASSEMBLY

(71) Applicant: Joseph Hamilton, Montgomery, TX (US)

(72) Inventor: Joseph Hamilton, Montgomery, TX (US)

( * ) Notice: Subject to any disclaimer, the term of this patent is extended or adjusted under 35 U.S.C. 154(b) by 369 days.

(21) Appl. No.: 17/690,233

(22) Filed: Mar. 9, 2022

(65) Prior Publication Data
US 2023/0285886 A1    Sep. 14, 2023

(51) Int. Cl.
*B01D 46/00* (2022.01)
*B01D 46/12* (2022.01)
*B01D 46/42* (2006.01)
*F01N 3/021* (2006.01)

(52) U.S. Cl.
CPC ..... *B01D 46/0012* (2013.01); *B01D 46/0005* (2013.01); *B01D 46/12* (2013.01); *B01D 46/4227* (2013.01); *F01N 3/0211* (2013.01); *F01N 3/0215* (2013.01); *B01D 2265/029* (2013.01); *B01D 2279/30* (2013.01)

(58) Field of Classification Search
CPC ............... B01D 46/0005; B01D 46/12; B01D 46/0012; B01D 46/4227; B01D 2265/029; B01D 2279/30; F01N 3/0211; F01N 3/0215; F01N 3/0093; F01N 3/021; F01N 2450/30; F01N 2590/08
USPC ....... 55/484, 486, 357, 501, DIG. 30, 385.3; 96/135; 60/275, 297; 123/198 E
See application file for complete search history.

(56) References Cited

U.S. PATENT DOCUMENTS

| | | | | |
|---|---|---|---|---|
| 2,004,865 | A * | 6/1935 | Grison | F01N 3/0211 |
| | | | | 423/247 |
| 3,675,398 | A * | 7/1972 | Giarrizzo | B01D 53/86 |
| | | | | 96/135 |
| 3,869,267 | A | 3/1975 | Gaylor | |
| 4,408,679 | A * | 10/1983 | Littrell | F24F 13/24 |
| | | | | 181/246 |
| 4,416,674 | A * | 11/1983 | McMahon | F01N 3/2882 |
| | | | | 55/501 |
| 4,578,091 | A * | 3/1986 | Borja | F23J 15/02 |
| | | | | 55/486 |
| 4,706,455 | A | 11/1987 | Johnsson | |
| 5,228,891 | A * | 7/1993 | Adiletta | D21H 27/38 |
| | | | | 55/484 |
| 5,423,904 | A * | 6/1995 | Dasgupta | B01D 46/62 |
| | | | | 55/282 |
| D394,236 | S | 3/1998 | Verlengiere | |
| 7,234,296 | B2 * | 6/2007 | Kojima | F01N 13/011 |
| | | | | 60/297 |

(Continued)

FOREIGN PATENT DOCUMENTS

WO    WO2017069722    4/2017

*Primary Examiner* — Minh Chau T Pham (57) ABSTRACT

A pollutant filtering assembly for filtering pollutants from vehicle exhaust includes a tube that has a diameter which is sufficient to facilitate the tube to be inserted into an exhaust pipe of a vehicle. A sleeve extends around the tube to facilitate the exhaust pipe to extend between the tube and the sleeve. A handle is pivotally coupled to the tube for inserting the tube into the exhaust pipe. A filtering cartridge is insertable into the tube. Each filtering element of a plurality of filtering elements of the filtering cartridge is made of a unique pollutant filtering material with respect to each other. Moreover, each of the filtering elements can filter pollutants from exhaust of the vehicle.

7 Claims, 6 Drawing Sheets

(56) References Cited

U.S. PATENT DOCUMENTS

| | | | | |
|---|---|---|---|---|
| 7,329,298 B1* | 2/2008 | Hasinski | ............... | B01D 39/12 |
| | | | | 210/779 |
| 7,866,145 B1* | 1/2011 | Lercher | .................... | F01N 3/01 |
| | | | | 60/275 |
| 10,159,923 B2* | 12/2018 | Ruhland | ............ | B01D 46/0005 |
| 10,823,024 B2* | 11/2020 | Chidubem | ............ | F01N 3/0211 |
| 2005/0217257 A1 | 10/2005 | Napoli | | |
| 2023/0166207 A1* | 6/2023 | Louison | ............. | B01D 46/2414 |
| | | | | 55/357 |

* cited by examiner

POLLUTANT FILTERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to filtering devices and more particularly pertains to a new filtering device for filtering pollutants from vehicle exhaust. The device includes a tube which is insertable into an exhaust pipe of a vehicle and a sleeve extending around the tube which receives the exhaust pipe. The device includes a filtering cartridge which includes a plurality of filtering elements. The filtering cartridge is removably insertable into the exhaust pipe for filtering pollutants from the vehicle exhaust.

(2) Description of Related Art Including Information Disclosed Under 37 CFR 1.97 and 1.98

The prior art relates to filtering devices including a filter that is attachable to an end of a vehicle exhaust pipe. The filter has a plurality of slots which each insertably receives a filtering puck for filtering pollutants from the vehicle exhaust. The prior art discloses a vehicle exhaust filter that comprises a fibrous material that is insertable into an exhaust pipe of a vehicle for filtering pollutants from the vehicle's exhaust. The prior art discloses an exhaust filter that is removably attachable to a vehicle exhaust pipe for temporarily filtering pollutants from vehicle exhaust when a vehicle is being operated indoors. The prior art discloses a vehicle exhaust filter which includes a cylinder that is insertable into an exhaust pipe and which has a plurality of circulation chambers integrated therein for circulating exhaust fumes through the cylinder and a dome shaped filtering element that is removably attachable to an end of the cylinder. The prior art discloses an exhaust filter which includes a foraminous cylinder that is positionable on an exhaust pipe of a vehicle for filtering pollutants from the vehicle's exhaust.

BRIEF SUMMARY OF THE INVENTION

An embodiment of the disclosure meets the needs presented above by generally comprising a tube that has a diameter which is sufficient to facilitate the tube to be inserted into an exhaust pipe of a vehicle. A sleeve extends around the tube to facilitate the exhaust pipe to extend between the tube and the sleeve. A handle is pivotally coupled to the tube for inserting the tube into the exhaust pipe. A filtering cartridge is insertable into the tube. The filtering cartridge has a plurality of filtering elements that is each comprised of a unique pollutant filtering material with respect to each other. Moreover, each of the filtering elements can filter pollutants from exhaust of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
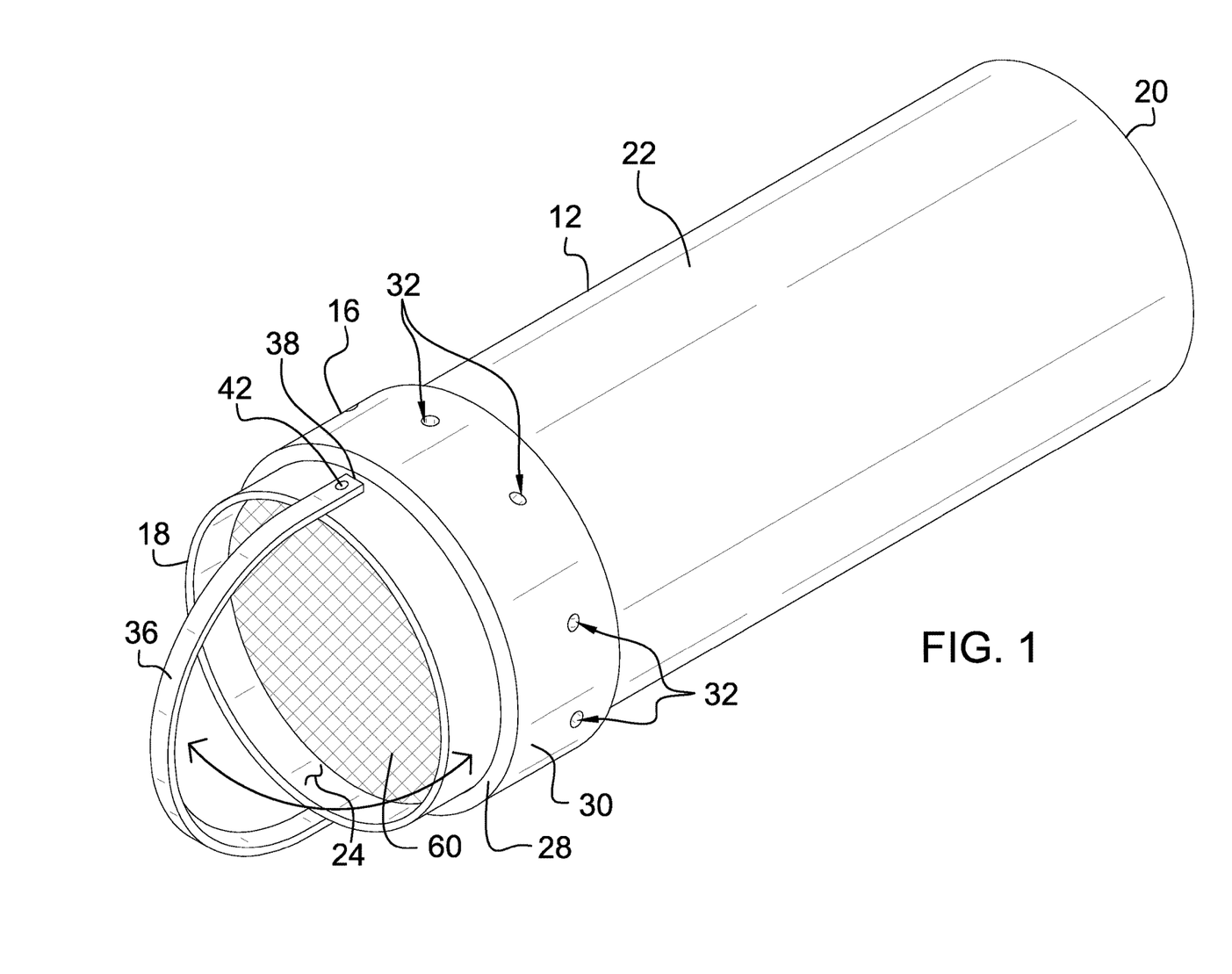
FIG. 1 is a perspective view of a pollutant filtering assembly according to an embodiment of the disclosure.
Figure 2:
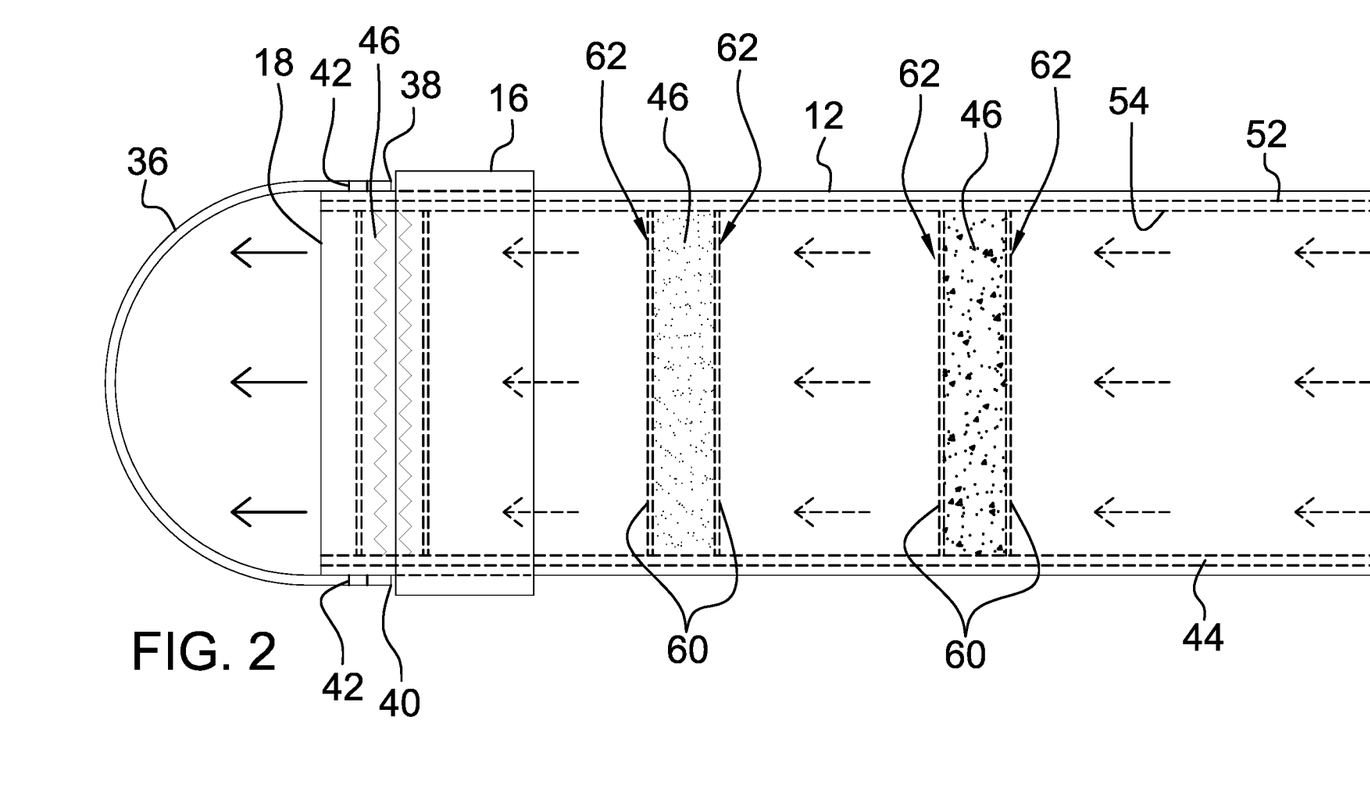
FIG. 2 is a right side cut-away view of an embodiment of the disclosure.
Figure 3:
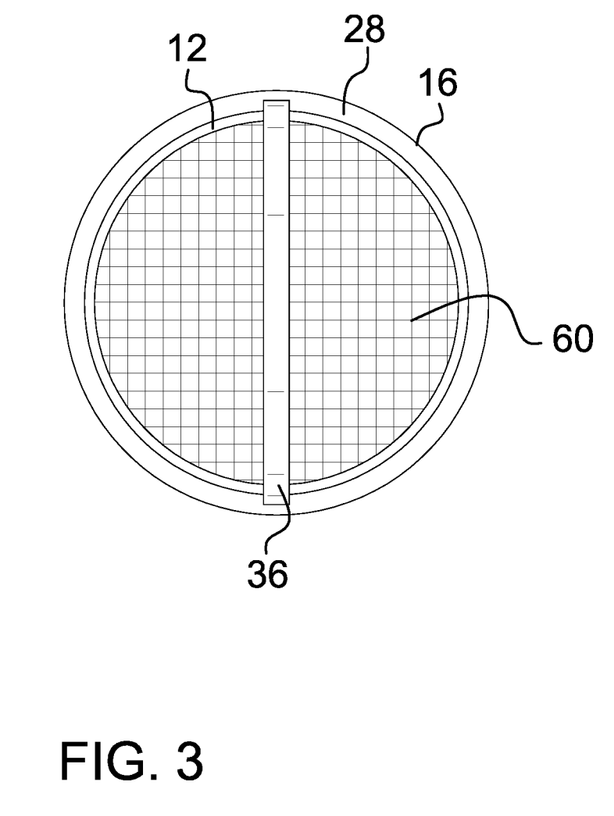
FIG. 3 is a front view of an embodiment of the disclosure.
Figure 4:
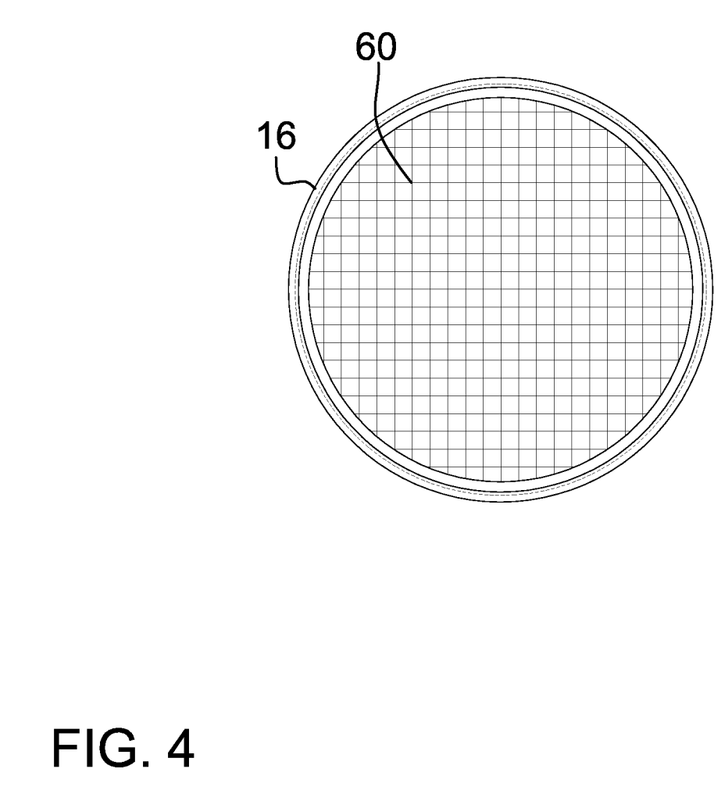
FIG. 4 is a back view of an embodiment of the disclosure.
Figure 5:
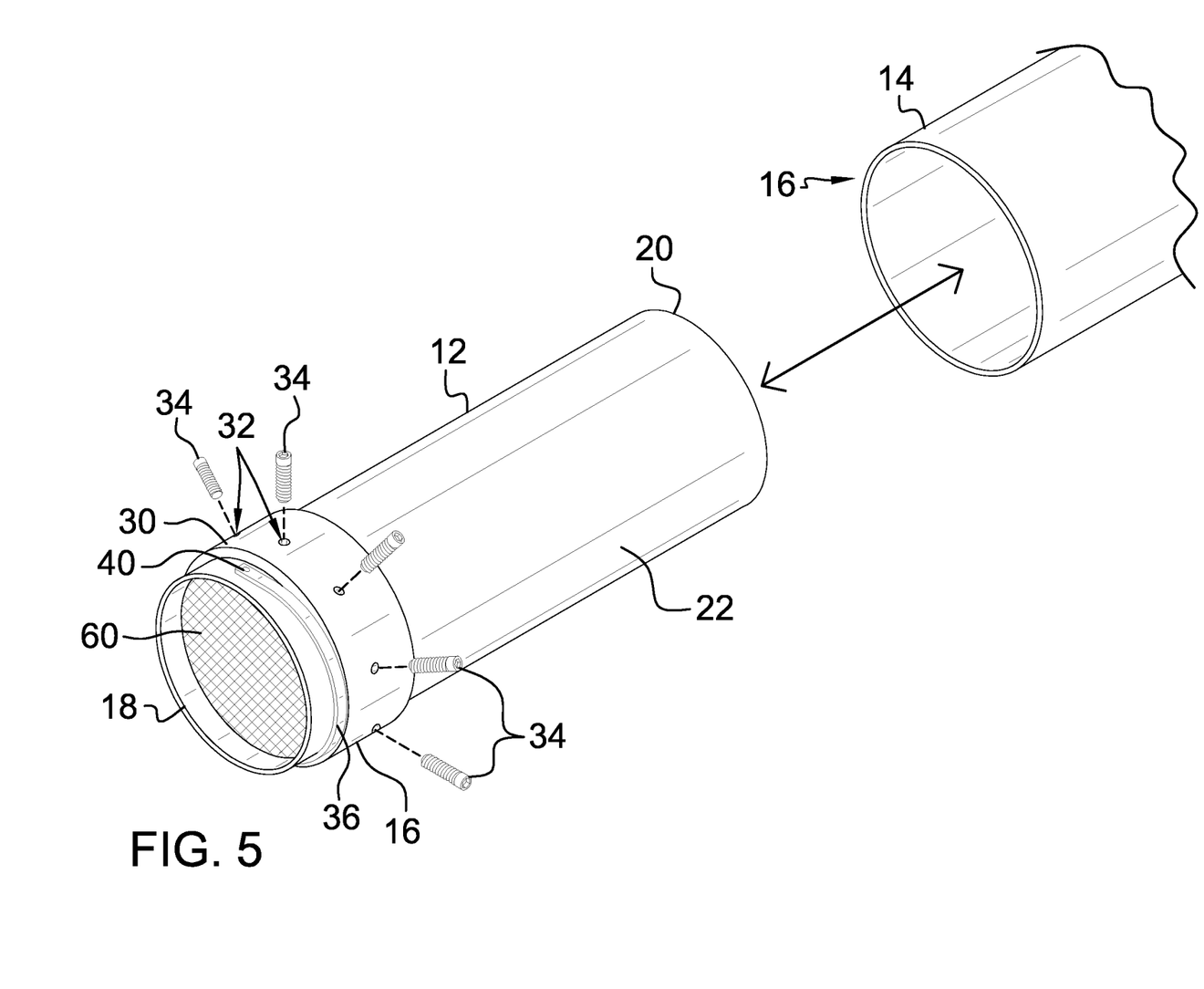
FIG. 5 is an exploded perspective view of an embodiment of the disclosure.
Figure 6:
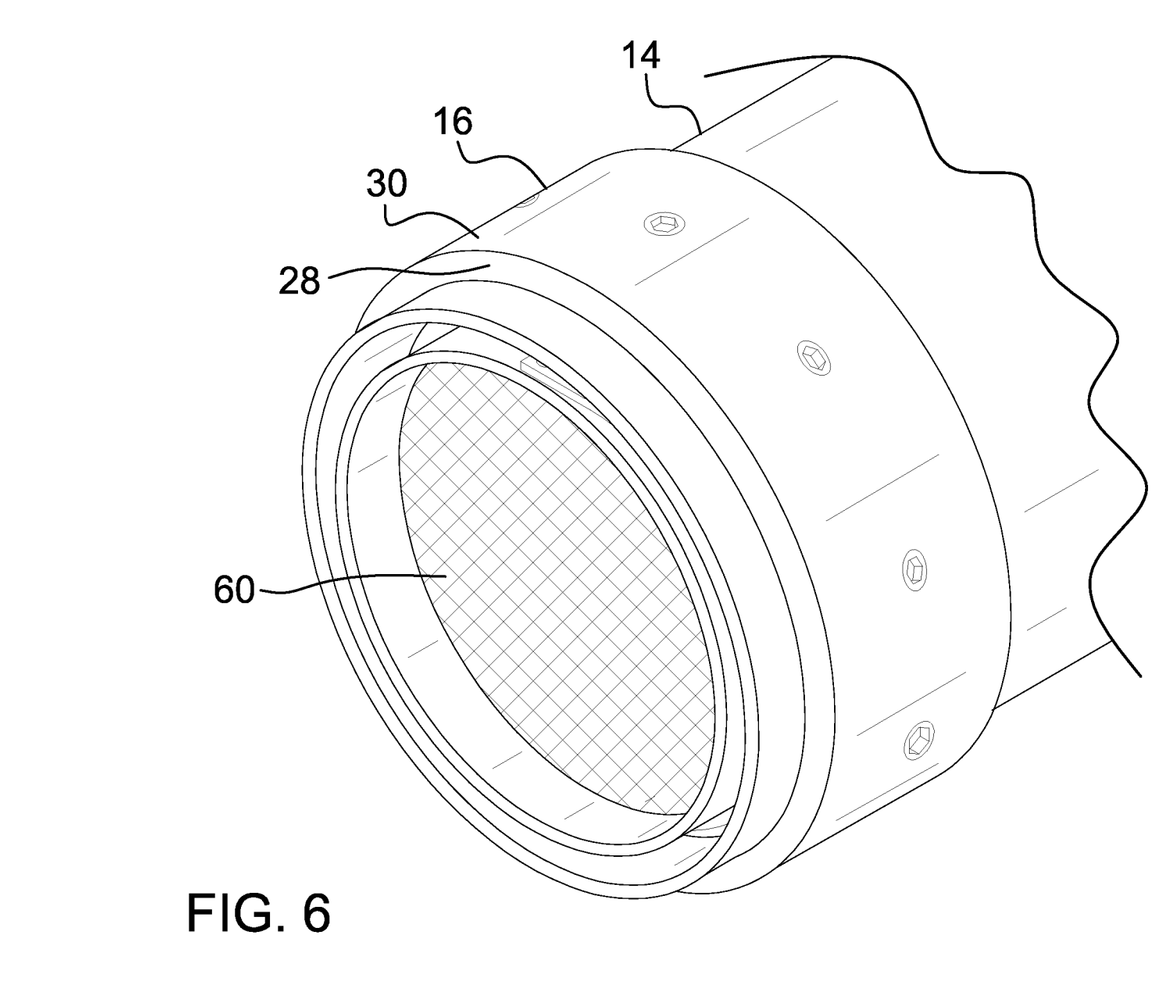
FIG. 6 is a perspective in-use view of an embodiment of the disclosure.
Figure 7:
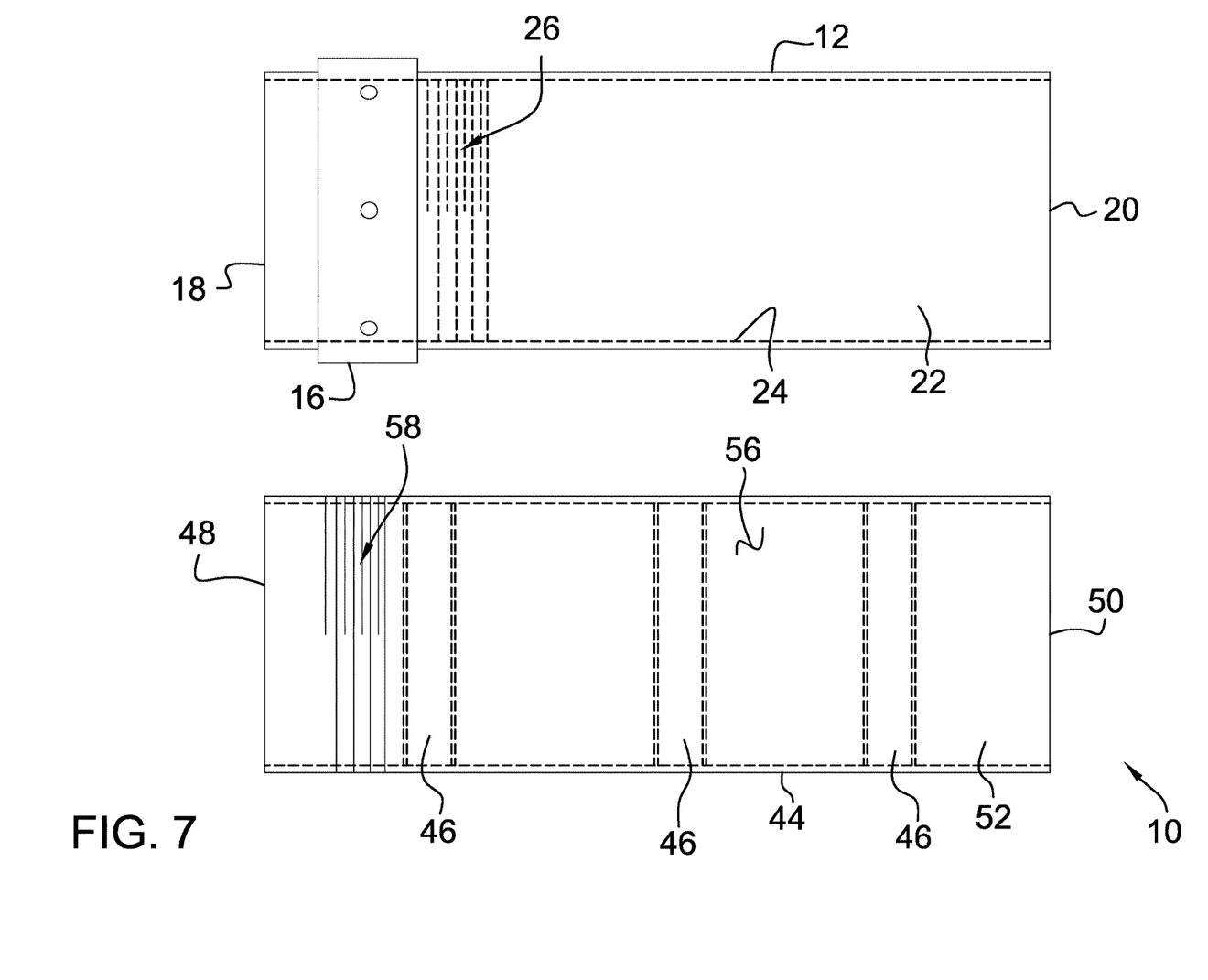
FIG. 7 is a perspective view of a tube and a filtering cartridge of an embodiment of the disclosure.

With reference now to the drawings, and in particular to FIGS. 1 through 7 thereof, a new filtering device embodying the principles and concepts of an embodiment of the disclosure and generally designated by the reference numeral 10 will be described.

As best illustrated in FIGS. 1 through 7, the pollutant filtering assembly 10 generally comprises a tube 12 that has a diameter which is sufficient to facilitate the tube 12 to be inserted into an exhaust pipe 14 of a vehicle 15. The tube 12 has a sleeve 16 extending around the tube 12 and the sleeve 16 has a diameter which is greater than the diameter of the tube 12 thereby facilitating the exhaust pipe 14 to extend between the tube 12 and the sleeve 16. The tube 12 has a first end 18, a second end 20 and an outer wall 22 extending between the first end 18 and the second end 20. The tube 12 is comprised of a rigid material, including but not being limited to steel or aluminum, thereby facilitating the tube 12 to resist being deformed by pressure of the exhaust from the vehicle 15. The outer wall 22 has an inside surface 24 and the inside surface 24 has a threaded portion 26 which is spaced from the first end 18 of the tube 12.

The sleeve 16 has a forward wall 28 extending outwardly from the outer wall 22 of the tube 12, the forward wall 28 is perpendicularly oriented with the outer wall 22 and the forward wall 28 is spaced from the first end 18 of the tube 12. The sleeve 16 has an exterior wall 30 extending away from the forward wall 28. The exterior wall 30 is perpendicularly oriented with the forward wall 28 and the exterior wall 30 extends around the outer wall 22 of the tube 12. Furthermore, the exterior wall 30 is spaced from the outer wall 22 thereby facilitating the exhaust pipe 14 to slide between the outer wall 22 of the tube 12 and the exterior wall 30 of the sleeve 16 when the tube 12 is inserted into the exhaust pipe 14.

The sleeve 16 has a plurality of holes 32 each extending through the exterior wall 30. The holes 32 are spaced apart from each other and are distributed around a full circumference of the exterior wall 30. A plurality of set screws 34 is provided and each of the set screws 34 is threadable into a respective one of the holes 32 in the exterior wall of the sleeve 16. Furthermore, each of the set screws 34 engages the exhaust pipe 14 when the set screws 34 are tightened for retaining the tube 12 in the exhaust pipe 14.

A handle 36 is pivotally coupled to the tube 12 such that the handle 36 can be gripped. The handle 36 is positionable in a deployed position having the handle 36 extending away from the tube 12 thereby facilitating the handle 36 to be gripped for inserting the tube 12 into the exhaust pipe 14. Conversely, the handle 36 is positionable in a stored position having the handle 36 resting against the sleeve 16. The handle 36 has a primary end 38 and a secondary end 40, and the handle 36 is elongated between the primary end 38 and the secondary end 40. Additionally, the handle 36 is curved between the primary end 38 and the secondary end 40 such that the handle 36 has a U-shape.

The handle 36 has a pair of pivot points 42 that is each positioned adjacent to a respective one of the primary end 38 and the secondary end 40. Each of the pivot points 42 pivotally engages the outer wall 22 of the tube 12 at a point that is located between the forward wall 28 of the sleeve 16 and the first end 18 of the tube 12. The handle 36 extends away from the first end 18 of the tube 12 when the handle 36 is in the deployed position. Conversely, the handle 36 rests against the forward wall 28 of the sleeve 16 when the handle 36 is in the stored position.

A filtering cartridge 44 is provided and the filtering cartridge 44 is insertable into the tube 12. The filtering cartridge 44 has a plurality of filtering elements 46 that is each comprised of a unique pollutant filtering material with respect to each other. Moreover, each of the filtering elements 46 can filter pollutants from exhaust of the vehicle 15. The plurality of filtering elements 46 may include a high temperature carbon filter comprising a solid that is fluid permeable. The plurality of filtering elements 46 may include a granular carbon filter. Additionally, the plurality of filtering elements 46 may include a ceramic filter comprising a solid that is fluid permeable.

The filtering cartridge 44 has a front end 48, a rear end 50 and an outside wall 52 extending between the front end 48 and the rear end 50, and the outside wall 52 is continuously arcuate about an axis extending between the front end 48 and the rear end 50 such that the filtering cartridge 44 has a tubular shape. The outside wall 52 has an interior surface 54 and an exterior surface 56, and the exterior surface 56 has a threaded portion 58 that is spaced from the front end 48. The threaded portion 58 of the exterior surface 56 threadably engages the threaded portion 26 of the inside surface 24 of the outer wall 22 of the tube 12 for retaining the filtering cartridge 44 in the tube 12.

The filtering cartridge 44 includes a plurality of mesh screens 60 and each of the mesh screens 60 engages the interior surface 54 of the outside wall 52. The mesh screens 60 are arranged into a plurality of pairs of the mesh screens 62. Furthermore, each of the pairs of mesh screens 62 is spaced apart from each other and is distributed between the front end 48 and the rear end 50 of the filtering cartridge 44. Each of the filtering elements 46 is positioned between a respective one of the pairs of mesh screens 62. Each of the mesh screens 60 may be comprised of a rigid material, including but not being limited to steel or aluminum, In use, the handle 36 is positioned in the deployed position such that the handle 36 can be gripped for inserting the tube 12 into the exhaust pipe 14 of the vehicle 15 until the exhaust pipe 14 abuts the forward wall 28 of the sleeve 16. The handle 36 is positioned in the stored position and each of the set screws 34 is threaded into the respective hole in the exterior wall 30 of the sleeve 16 to secure the sleeve 16 to the exhaust pipe 14. In this way the filtering cartridge 44 filters pollutants from the vehicle 15 exhaust for reducing air pollution produced by the vehicle 15 exhaust. The filtering cartridge 44 is removed and replaced in the tube 12 when each of the filtering elements 46 becomes filled with pollutants.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pollutant filtering assembly for filtering pollutants from an exhaust of a machine, said assembly comprising:
    a tube having a diameter being sufficient to facilitate said tube to be inserted into an exhaust pipe of a vehicle, said tube having a sleeve extending around said tube, said sleeve having a diameter being greater than said diameter of said tube thereby facilitating the exhaust pipe to extend between said tube and said sleeve;
    a handle being pivotally coupled to said tube wherein said handle is configured to be gripped, said handle being positionable in a deployed position having said handle extending away from said tube thereby facilitating said handle to be gripped for inserting said tube into the exhaust pipe, said handle being positionable in a stored position having said handle resting against said sleeve;

a filtering cartridge being insertable into said tube, said filtering cartridge having a plurality of filtering elements each being comprised of a unique pollutant filtering material with respect to each other wherein each of said filtering elements is configured to filter pollutants from exhaust of the vehicle;

wherein said tube has a first end, a second end and an outer wall extending between said first end and said second end;

wherein said sleeve has a forward wall extending outwardly from said outer wall of said tube, said forward wall being perpendicularly oriented with said outer wall, said forward wall being spaced from said first end of said tube;

wherein said sleeve has an exterior wall extending away from said forward wall, said exterior wall being perpendicularly oriented with said forward wall, said exterior wall extending around said outer wall of said tube, said exterior wall being spaced from said outer wall thereby facilitating the exhaust pipe to slide between said outer wall of said tube and said exterior wall of said sleeve when said tube is inserted into the exhaust pipe;

wherein said sleeve has a plurality of holes each extending through said exterior wall, said holes being spaced apart from each other and being distributed around a full circumference of said exterior wall;

wherein said outer wall of said tube has an inside surface, said inside surface having a threaded portion being spaced from said first end of said tube; and a plurality of set screws, each of said set screws being threadable into a respective one of said holes in said exterior wall of said sleeve, each of said set screws engaging the exhaust pipe when said set screws are tightened for retaining said tube in the exhaust pipe.

2. The assembly according to claim 1, wherein:

said handle has a primary end and a secondary end, said handle being elongated between said primary end and said secondary end, said handle being curved between said primary end and said secondary end such that said handle has a U-shape;

said handle having a pair of pivot points each being positioned adjacent to a respective one of said primary end and said secondary end, each of said pivot points pivotally engaging said outer wall of said tube at a point being located between said forward wall of said sleeve and said first end of said tube;

said handle extends away from said first end of said tube when said handle is in said deployed position; and said handle rests against said forward wall of said sleeve when said handle is in said stored position.

3. The assembly according to claim 1, wherein said filtering cartridge has a front end, a rear end and an outside wall extending between said front end and said rear end, said outside wall being continuously arcuate about an axis extending between said front end and said rear end such that said filtering cartridge has a tubular shape, said outside wall having an interior surface and an exterior surface, said exterior surface having a threaded portion being spaced from said front end, said threaded portion of said exterior surface threadably engaging said threaded portion of said inside surface of said outer wall of said tube for retaining said filtering cartridge in said tube.

4. The assembly according to claim 3, wherein said filtering cartridge includes a plurality of mesh screens, each of said mesh screens engaging said interior surface of said outside wall.

5. The assembly according to claim 4, wherein said mesh screens are arranged into a plurality of pairs of said mesh screens, each of said pairs of mesh screens being spaced apart from each other and being distributed between said front end and said rear end of said filtering cartridge.

6. The assembly according to claim 5, wherein each of said filtering elements is positioned between a respective one of said pairs of mesh screens.

7. A pollutant filtering assembly for filtering pollutants from an exhaust of a machine, said assembly comprising:

a tube having a diameter being sufficient to facilitate said tube to be inserted into an exhaust pipe of a vehicle, said tube having a sleeve extending around said tube, said sleeve having a diameter being greater than said diameter of said tube thereby facilitating the exhaust pipe to extend between said tube and said sleeve, said tube having a first end, a second end and an outer wall extending between said first end and said second end, said sleeve having a forward wall extending outwardly from said outer wall of said tube, said forward wall being perpendicularly oriented with said outer wall, said forward wall being spaced from said first end of said tube, said sleeve having an exterior wall extending away from said forward wall, said exterior wall being perpendicularly oriented with said forward wall, said exterior wall extending around said outer wall of said tube, said exterior wall being spaced from said outer wall thereby facilitating the exhaust pipe to slide between said outer wall of said tube and said exterior wall of said sleeve when said tube is inserted into the exhaust pipe, said sleeve having a plurality of holes each extending through said exterior wall, said holes being spaced apart from each other and being distributed around a full circumference of said exterior wall, said outer wall having an inside surface, said inside surface having a threaded portion being spaced from said first end of said tube;

a handle being pivotally coupled to said tube wherein said handle is configured to be gripped, said handle being positionable in a deployed position having said handle extending away from said tube thereby facilitating said handle to be gripped for inserting said tube into the exhaust pipe, said handle being positionable in a stored position having said handle resting against said sleeve, said handle having a primary end and a secondary end, said handle being elongated between said primary end and said secondary end, said handle being curved between said primary end and said secondary end such that said handle has a U-shape, said handle having a pair of pivot points each being positioned adjacent to a respective one of said primary end and said secondary end, each of said pivot points pivotally engaging said outer wall of said tube at a point being located between said forward wall of said sleeve and said first end of said tube, said handle extending away from said first end of said tube when said handle is in said deployed position, said handle resting against said forward wall of said sleeve when said handle is in said stored position;

a plurality of set screws, each of said set screws being threadable into a respective one of said holes in said exterior wall of said sleeve, each of said set screws engaging the exhaust pipe when said set screws are tightened for retaining said tube in the exhaust pipe; and a filtering cartridge being insertable into said tube, said filtering cartridge having a plurality of filtering elements each being comprised of a unique pollutant filtering material with respect to each other wherein each of said filtering elements is configured to filter pollutants from exhaust of the vehicle, said filtering cartridge having a front end, a rear end and an outside wall extending between said front end and said rear end, said outside wall being continuously arcuate about an axis extending between said front end and said rear end such that said filtering cartridge has a tubular shape, said outside wall having an interior surface and an exterior surface, said exterior surface having a threaded portion being spaced from said front end, said threaded portion of said exterior surface threadably engaging said threaded portion of said inside surface of said outer wall of said tube for retaining said filtering cartridge in said tube, said filtering cartridge including a plurality of mesh screens, each of said mesh screens engaging said interior surface of said outside wall, said mesh screens being arranged into a plurality of pairs of said mesh screens, each of said pairs of mesh screens being spaced apart from each other and being distributed between said front end and said rear end of said filtering cartridge, each of said filtering elements being positioned between a respective one of said pairs of mesh screens.

\* \* \* \* \*